(12) United States Patent
Kondoh (10) Patent No.: US 9,141,535 B2
(45) Date of Patent: Sep. 22, 2015

(54) ELECTRONIC CONTROL UNIT WITH MEMORY SWITCHING AND CONTROL PROGRAM REWRITING

(71) Applicant: DENSO CORPORATION, Kariya, Aichi-pref. (JP)

(72) Inventor: Nobuyuki Kondoh, Nisshin (JP)

(73) Assignee: DENSO CORPORATION, Kariya (JP)

( * ) Notice: Subject to any disclaimer, the term of this patent is extended or adjusted under 35 U.S.C. 154(b) by 191 days.

(21) Appl. No.: 13/910,248

(22) Filed: Jun. 5, 2013

(65) Prior Publication Data

US 2013/0326126 A1 Dec. 5, 2013

(30) Foreign Application Priority Data

Jun. 5, 2012 (JP) ................. 2012-128211

(51) Int. Cl.
 G06F 13/12 (2006.01)
 G06F 12/02 (2006.01)
 G06F 9/445 (2006.01)
(52) U.S. Cl.
 CPC .............. *G06F 12/0246* (2013.01); *G06F 8/65* (2013.01); *G06F 12/0238* (2013.01)
(58) Field of Classification Search
 None
 See application file for complete search history.

(56) References Cited

U.S. PATENT DOCUMENTS

2005/0122790 A1* 6/2005 Ueno et al. ............... 365/189.05
2006/0259207 A1 11/2006 Natsume
2009/0271064 A1 10/2009 Enomoto et al.
2011/0307879 A1* 12/2011 Ishida et al. .................. 717/170

FOREIGN PATENT DOCUMENTS

JP 2002-297458 A 10/2002
JP 2004-220519 A 8/2004
JP 2010-198307 A 9/2010

OTHER PUBLICATIONS

Office Action mailed Dec. 9, 2014 issued in corresponding JP patent application No. 2012-128211 (and English translation).
Office Action mailed May 7, 2014 issued in corresponding JP patent application No. 2012-138211 (and English translation).
Office Action mailed May 7, 2014 issued in corresponding JP patent application No. 2012-128211 (and English translation).

* cited by examiner

Primary Examiner — Idriss N Alrobaye
Assistant Examiner — David Martinez
(74) Attorney, Agent, or Firm — Posz Law Group, PLC (57) ABSTRACT

An electronic control unit (ECU) has a memory area in a non-volatile memory that stores a control program in a rewritable manner for controlling a predetermined control object. The ECU also has an operation unit for performing a process according to the control program stored in the memory and for performing a rewrite process to rewrite contents of the control program stored in the memory area when a predetermined rewrite condition is met. The memory area has a plurality of sub-memory areas that are exclusively defined in a non-overlapping manner. From among the plurality of sub-memory areas a read sub-memory area, from which the control program is read by the operation unit to perform the process according to the control program, is different and separate from a rewrite sub-memory area, which stores program contents of the control program that is rewritten by the rewrite process.

3 Claims, 5 Drawing Sheets

ELECTRONIC CONTROL UNIT WITH MEMORY SWITCHING AND CONTROL PROGRAM REWRITING

CROSS REFERENCE TO RELATED APPLICATION

This application is based on and claims the benefit of priority of Japanese Patent Application No. 2012-128211 filed on Jun. 5, 2012, the disclosure of which is incorporated herein by reference.

TECHNICAL FIELD

The present disclosure generally relates to an electronic control unit having a program stored therein in a rewritable manner.

BACKGROUND

Conventionally, an electronic control unit (ECU) is equipped with a flash memory, an EEPROM or the like, which is a rewritable non-volatile memory, for controlling, for example, a vehicle engine and a vehicle transmission. Contents of such rewritable non-volatile memory are electrically rewritable (i.e., data is erasable therefrom and writable therein). Further, a control program stored in such rewritable non-volatile memory is rewritable and replaceable.

A vehicle having the ECU is usually brought to a dealership by an owner of the vehicle for the rewriting of the control program stored in the ECU. That is, the control program is rewritten by a rewrite program at the dealership, under control of a mechanic by using a rewrite device. Such rewrite scheme is disclosed in Japanese Patent Laid-Open No. 2004-220519.

However, such rewrite scheme may have to handle various changes, which are expected to occur. For example, various connection channels between the vehicle and a network maybe newly developed and established. Also, more and more vehicles would be shared by many users under management of an organization, instead of solely owned by respective users. Further, programs stored in the ECU would become more complicated and sophisticated, thereby necessitating frequent program updates for coping with security risks and the like.

In view of such changes, it may be desirable to have the user perform the rewriting of the programs, instead of having the user bring the vehicle to the dealership. That is, for the convenience of the user and for countering the security risk, the rewriting of the programs (i.e., may also be designated as "re-program" hereinafter) may be remotely performed.

In consideration of improved user convenience and prevention of mis-operation in the re-program process, the re-program may need to be remotely performed regardless of the operation state of the vehicle, or regardless of the transition from one operation state to the other state. That is, such re-program may need to be performed regardless of the operation state of the vehicle, such as a traveling state or a parking state, or regardless of the state transition from an ignition OFF to an ignition ON.

However, in, for example, a traveling vehicle, a program in the ECU is continuously executed, and the re-program during such a continuous execution of the program may lead to a hang up of the program, such that the program may become uncontrollable due to a "crash" of a computer executing the program.

For instance, a series of processes A, B, and C are controlled by a certain program, among which the processes A and C are designed to use the same data D1. The processes A, B, C may have an incorrect processing result, if (i) the program is designed on an assumption that the same data is used by both of the process A and the process C, (ii) the re-program is performed during the execution time of the process B, and (iii) the data D1 is rewritten to have a different value by such re-program. As a result, the program controlling the processes A, B, C may crash.

Further, the state transition between vehicle operation states may be un-predictable, and the re-program at the time of such state transition may also result in damaged data. For example, in an ECU that stops the power supply for a microcomputer at a time of transition from the ignition ON state to the ignition OFF state, the interrupted power supply for the microcomputer during the re-program process due to the state transition from the ignition ON state to the ignition OFF state may result in an interrupted re-program process and in an interrupted data rewriting in the interrupted re-program process, thereby damaging data and leading to an incorrect operation of the ECU at the next ignition ON time.

SUMMARY

In an aspect of the present disclosure, an electronic control unit (ECU) includes a memory area in a non-volatile memory for storing a control program that controls a predetermined control object. The memory area is rewriteable, and has a plurality of sub-memory areas exclusively defined in a non-overlapping manner.

The ECU further includes an operation unit for performing a process according to the control program stored in the non-volatile memory, and for performing a rewrite process to rewrite contents of the control program stored in the memory area when a predetermined rewrite condition is met. From among the plurality of sub-memory areas of the memory area, a read sub-memory area, from which the control program is read by the operation unit to perform the process according to the control program, is different and separate from a rewrite sub-memory area, which stores program contents of the control program that is rewritten by the rewrite process.

Based on the configuration of the ECU, since the read sub-memory area and the rewrite sub-memory area are provided as two exclusive sub-memory areas, the control program in the read sub-memory area will not be rewritten even when the rewrite process is performed during the execution of the control program by the operation unit. Therefore, the control program may be rewritten even during the execution of the control program.

Further, even when a power supply for the ECU is stopped during the rewrite process, data of the control program in the rewrite sub-memory area is recovered by restarting the rewrite process after the power supply is resumed, and data of the control program in the read sub-memory area will remain unbroken. Therefore, the control program is rewritten independently from an operation state of ECU, that is, without consideration of an interruption of the power supply to the ECU.

Thus, an ECU state independent program rewriting for rewriting a control program in ECU is performable.

The electronic control unit may further include a read switch unit and a rewrite switch unit. The read switch unit selectively switches to one of the plurality of sub-memory areas, as the read sub-memory area, from which the control program is read by the operation unit when the operation unit performs a process according to the read control program. The rewrite switch unit selectively switches to one of the plurality of sub-memory areas, as the rewrite sub-memory area, in which program contents of the control program is rewritten by the rewrite process.

The rewrite switch unit is configured to selectively switch to a sub-memory area that is different from a sub-memory area to which the read switch unit is currently switched, which enables the read sub-memory area to be different from the rewrite sub-memory area. The read switch unit is configured to switch to a sub-memory area in which the program contents of the control program have been rewritten by the rewrite process after completion of the rewrite process and upon satisfying a read switching condition that is set according to the program contents of the control program rewritten by the rewrite process.

In such configuration of the ECU, a read area, from which the control program is read, is switched at an appropriate timing that is appropriately set according to the control program, which was rewritten. Thus, switching from an old control program to an updated control program will not cause a problem.

In particular, a read switching condition may be, for example, defined as a condition that a currently-performed process that is controlled by the control program is not controlled by a rewrite-affected portion of the control program, which is changed during a rewrite process of the control program. That is, the rewrite-affected portion of the control program has the program contents rewritten by the rewrite process. Accordingly, when a portion of the control program, which is to be changed by the rewrite process, is not currently executed, such a situation may be defined as a read switching condition. Further, a read switching condition may also be defined as a condition that will not cause an abnormal operation of the control program. That is, for example, the read switching condition may include a state that the control program, which has been rewritten, is not in operation. More practically, either of the following two states will suffice the read switching condition: (i) a rewritten portion of the control program is not in operation, or (ii) the control program is not in operation as a whole.

In such manner, the inconsistency of the program contents during the execution of the control program by the operation unit is prevented for a secure and problem-free operation of the control program.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

An embodiment of the present disclosure is described in the following with reference to the drawing.

Figure 1:
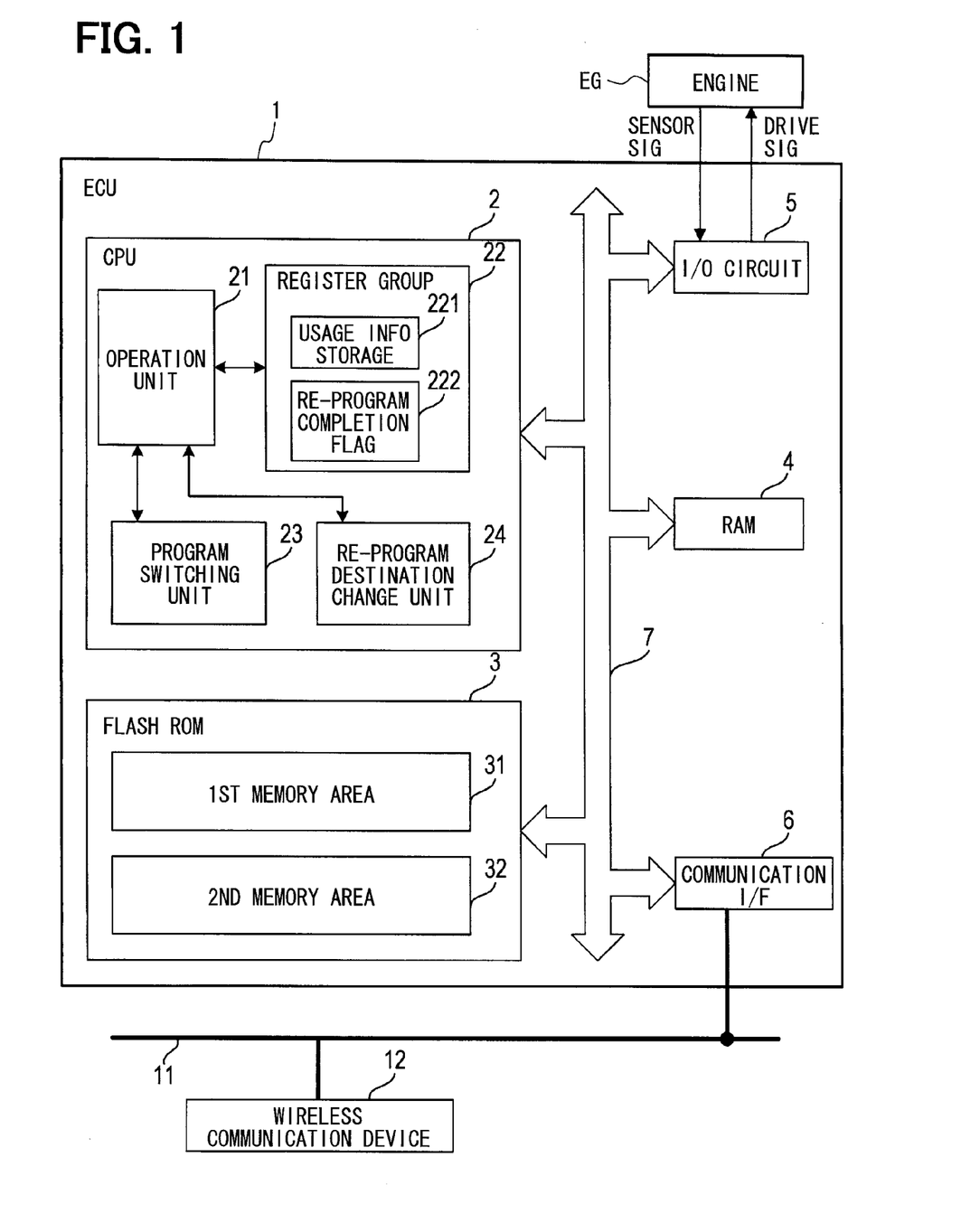
FIG. 1 is a block diagram of an ECU of the present disclosure.

With reference to FIG. 1, an electronic control unit (ECU) 1 of the present embodiment, which is installed in a vehicle, controls an engine EG of the vehicle.

ECU 1 has a central processing unit (CPU) 2, a flash ROM 3, RAM 4, an input and output circuit (I/O circuit) 5, a communication interface 6, and a bus 7 for inter-connecting the above components.

The flash ROM 3 is a nonvolatile memory that stores a program that is performed by CPU 2. A first memory area 31 and a second memory area 32 are provided in the ROM 3.

The RAM 4 is a volatile memory that temporarily stores operation results of CPU 2.

The I/O circuit 5 inputs a signal from various sensors that detect an operation state of the engine EG, and the signals undergo a rectifying process to correct the signal's waveform. The I/O circuit 5 also outputs a drive signal according to a control signal from CPU 2 to electric loads (e.g., engine components such as an ignition device or an injector).

The communication interface (i.e., communication I/F) 6 mediates data communication with various devices in the vehicle through an in-vehicle LAN 11. Further, the in-vehicle LAN 11 is connected to a wireless communication device 12 that performs wireless communication with a remote center that is disposed outside of the vehicle.

The remote center is set up for enabling a remote update of the program that is stored in the flash ROM 3, thereby allowing the user of a vehicle to update the program without bringing the vehicle to the dealership. When the program needs to be updated, the remote center transmits the data of a new program by performing wireless communication with the wireless communication device 12 carried by the vehicle, which ultimately transmits the data to ECU 1.

CPU 2 performs various processes based on the program stored in the flash ROM 3. Further, CPU 2 performs control operations based on various signals that are received through the I/O circuit 5. Also, based on the operation results, CPU 2 controls the engine's EG related electric loads, such as the ignition or the injector, by outputting the drive signal to the electric loads through the I/O circuit 5. For example, CPU 2 calculates a valve open timing and a valve open duration of the injector. Based on the results of such calculation, CPU 2 controls a fuel injection of the engine by outputting the drive signal that controls the injector.

CPU 2 includes an operation unit 21 for executing a program and a register group 22 that has multiple registers that are used for storing data for the operation unit 21. CPU 2 performs a process according to a predetermined processing program. Further, a usage information storage 221 and a re-program completion flag 222 are provided in a register of the register group 22.

The usage information storage 221 stores information indicative of a memory area that stores a program that is currently executed by CPU 2. The re-program completion flag 222 is set, or turned ON, when re-program is complete.

CPU 2 also includes a program switching unit 23 and a re-program destination change unit 24. The program switching unit 23 is a hardware component that has an address selection function for changing an address in order to have access to the flash ROM 3, so that CPU 2 has access to the program stored in the first memory area 31 or the second memory area 32 of the flash ROM 3. In particular, when a program switch instruction is received from the operation unit 21, the program switching unit 23 performs a program switching operation to change the address. For instance, when the program switch instruction is received in a state in which the program switching unit 23 is currently accessing the first memory area 31, the program switching unit 23 is switched to perform an address selection to access the second memory area 32. When the program switch instruction is inputted once again, the program switching unit 23 is switched to perform the address selection to access the first memory area 31.

The re-program destination change unit 24 is a hardware component that has an address selection function for changing an address in order to have access to the flash ROM 3, so that CPU 2 may rewrite a program that is stored in the ROM 3 (i.e., in the first memory area 31 or the second memory area 32). More practically, when information indicative of the first memory area 31 is stored in the usage information storage 221, the re-program destination change unit 24 changes the address so that the program is to be written in the second memory area 32. Conversely, when information indicative of the second memory area 32 is stored in the usage information storage 221, the re-program destination change unit 24 changes the address, so that the program is to be written in the first memory area 31.

Figure 2:
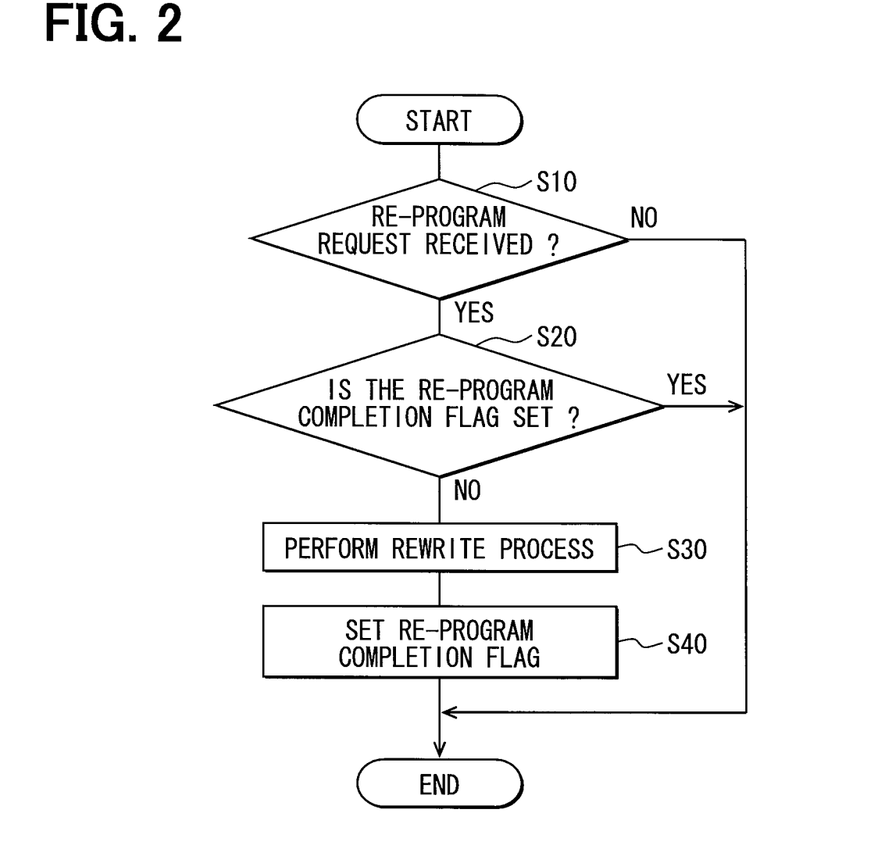
FIG. 2 is a flowchart of a re-program process.
Figure 3:
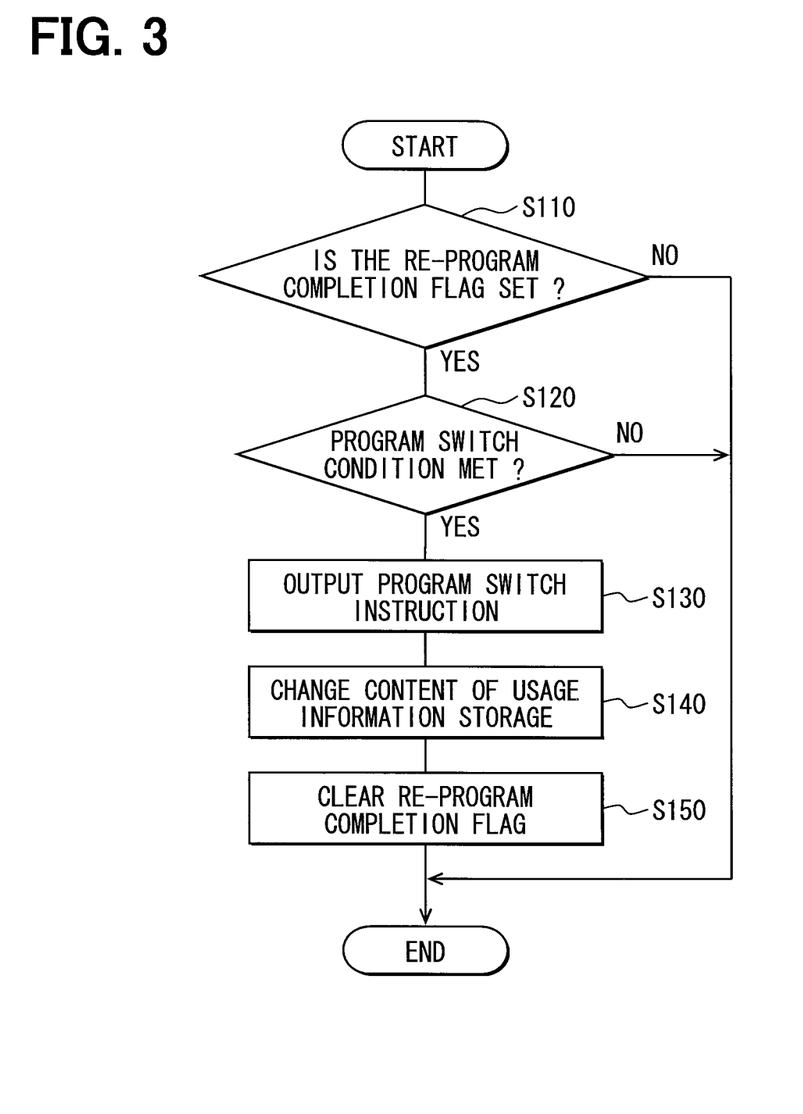
FIG. 3 is a flowchart of a program switching process.

A re-program process and a program switching process performed by the operation unit 21 of ECU 1 are described with reference to FIG. 2 and FIG. 3 in the following. The re-program process and the program switching process are repeatedly performed during an operation time of CPU 2.

When the re-program process begins, the operation unit 21 of CPU 2 determines, at S10, whether a re-program request from the remote center has been received based on the data that is acquired through the wireless communication device 12.

When the re-program request has not been received (S10: NO), the operation unit 21 finishes the re-program process. On the other hand, when the re-program request has been received (S10:YES), then, at S20, the operation unit 21 determines whether the re-program completion flag 222 is set.

When the re-program completion flag 222 is set (S20: YES), the operation unit 21 finishes the re-program process. On the other hand, when the re-program completion flag 222 is clear or not set (S20:NO), then, at S30, the operation unit 21 performs a rewrite process to write, in the flash ROM 3, a new program transmitted through the wireless communication device 12 from the remote center.

Further, when a rewrite error occurs during the rewrite process, the rewrite process is performed again. Such rewrite errors may occur during a power interruption due to a sudden stall of the engine operation or a lack of rewrite data due to an interruption of data reception.

To confirm the re-program process has correctly written the new program, the re-program completion flag 222, which indicates the re-program is complete when set, may be examined, or other method for examining the correct writing of the new program may be performed. Such method may be, for example, a periodical examination of the progress of writing the new program that examines how far the new program writing has completed.

Since the re-program destination change unit 24 is configured to perform the address selection, which enables the new program to be written in a target memory area, the operation unit 21 is not required to recognize which one of the first memory area 31 and the second memory area 32 is the target memory area for rewriting the new program.

When the rewrite process is complete at S30, then, at S40, the operation unit 21 sets the re-program completion flag 222, and finishes the re-program process.

When the program switching process begins, the operation unit 21 determines, at S110, whether the re-program completion flag 222 is set. When the re-program completion flag 222 is clear (i.e., not set) (S110:NO), the operation unit 21 finishes the program switching process. On the other hand, when the re-program completion flag 222 is set (S110:YES), then, at S120, the operation unit 21 determines whether a predetermined program switch condition is met.

The program switch condition is prepared as a condition that indicates a state in which a safe operation of program switching is performable which will not cause an abnormal operation of the program. Such a condition is set according to program contents of the program that have been rewritten by the rewrite process. For example, it may be preferable that a state in which the program, which has been rewritten and is not in operation, is defined as the program switch condition. Generally, the program switch condition may be performed when: (i) a rewritten portion of the program is not in operation, or (ii) the program is not in operation as a whole.

More practically, when, from among many programs stored in the flash ROM 3, a program, which has been rewritten, is not to be executed during, for example, travel at a certain speed or more (e.g., an idling stop program or a similar program), the program switch condition may be defined as a vehicle speed of a certain value (e.g., 50 km/h) or more. Further, other examples of the program switch condition may be an operation of a certain component (e.g., a shift lever) during travel at a certain speed or less, or a charge condition of a vehicle.

When the program switch condition is not met (S120:NO), the operation unit 21 finishes the program switching process. On the other hand, when the program switch condition is met (S120:YES), then, at S130, the operation unit 21 outputs the program switch instruction to the program switching unit 23.

In such manner, the program switching unit 23 switches the memory area for storing the program, and, after completion of such switching, outputs a switch completion notice.

At S140, the operation unit 21 waits for the switch completion notice from the program switching unit 23. When the switch completion notice is received, the operation unit 21 stores, in the usage information storage 221, information indicating the memory area that stores the program to be executed. The operation unit 21 then clears the re-program completion flag 222 at 150, and finishes the program switching process.

A procedure to switch a re-program destination and to switch a program to be used is now described with reference to FIGS. 4 and 5, where "O" indicates access permitted and "X" access not permitted.

Figure 4:
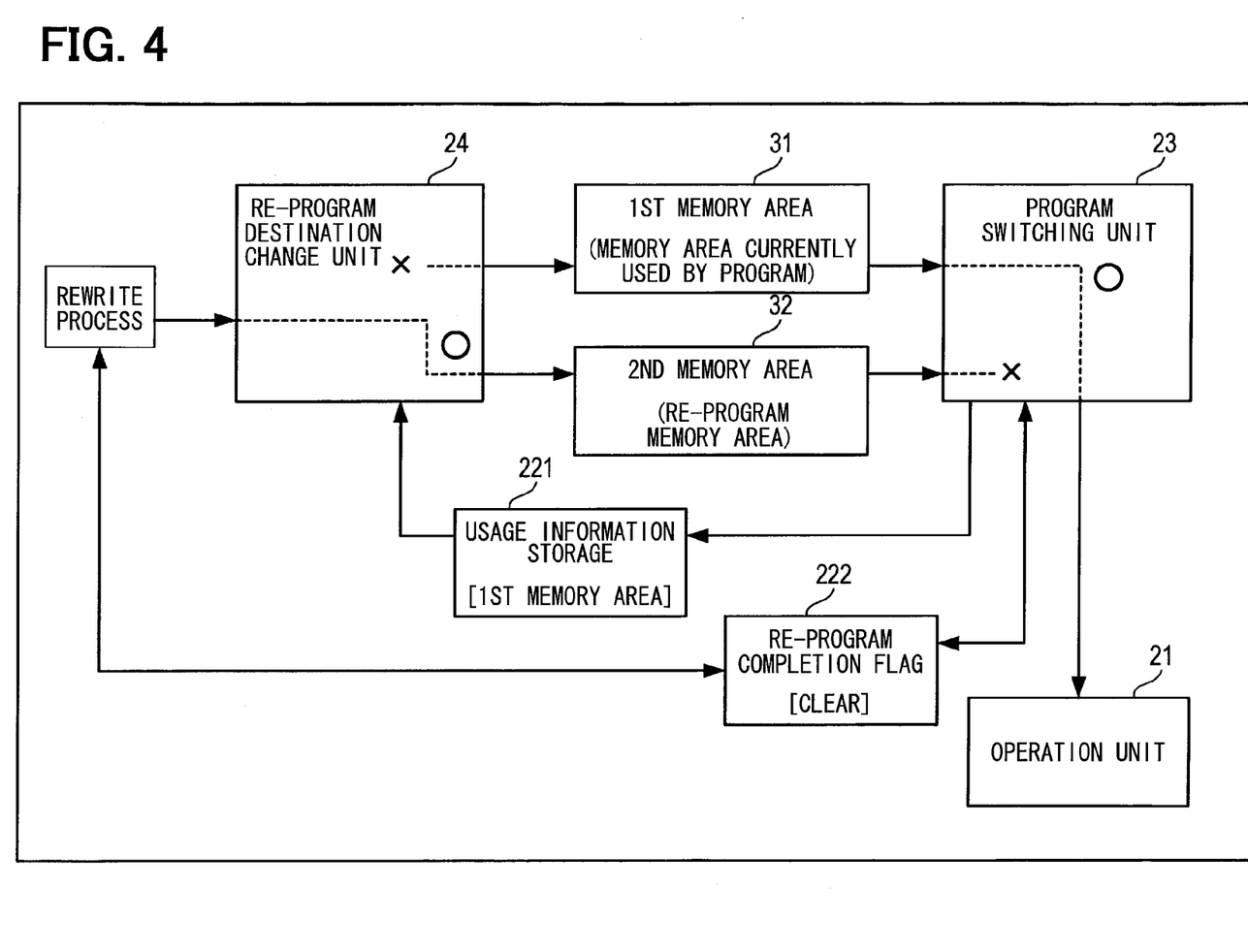
FIG. 4 is an illustration of a pre-rewrite state of a program.

With reference to FIG. 4, it is assumed that the operation unit 21 is currently performing a process by executing the program that is stored in the first memory area 31. Accordingly, the program switching unit 23 is in a state in which the address selection was already performed to have the operation unit 21 have access to the first memory area 31. In such a state, information indicative of the first memory area 31 is stored in the usage information storage 221, and the re-program completion flag 222 was cleared. Further, the re-program destination change unit 24 performs the address selection so that a program can be written in the second memory area 32.

Upon receiving a re-program request from the remote center, a new program is written in the second memory area 32 of the flash ROM 3 by the rewrite process, since the re-program completion flag 222 is clear.

Figure 5:
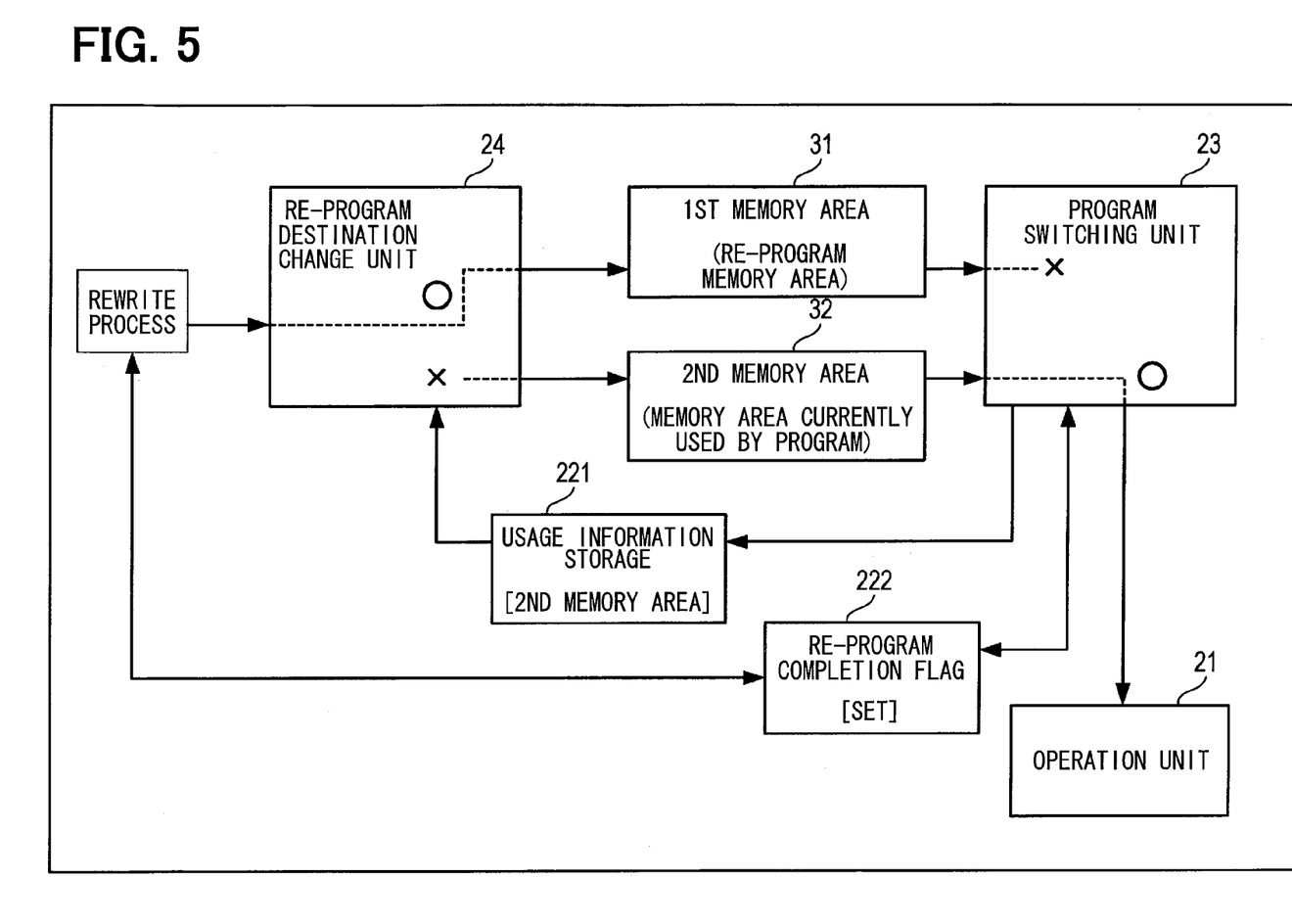
FIG. 5 is an illustration of a post-rewrite state of the program.

After writing the new program, the re-program completion flag 222 is set, as shown in FIG. 5. Upon satisfying the program switch condition, the program switching unit 23 is put in a state of performing the address selection to change the address, so that the operation unit 21 may access the second memory area 32, which enables information indicative of the second memory area 32 to be stored in the usage information storage 221. In such manner, the re-program completion flag 222 is cleared, and, the re-program destination change unit 24 is put in a state of performing the address selection to change the address so that a program may be written in the first memory area 31.

According to the configuration of ECU 1, ECU 1 has a memory area for storing a control program that controls the engine EG, and has the flash ROM 3 that is rewritable to update stored content. The operation unit 21 is configured to perform a process according to the control program in the flash ROM 3, and, when the re-program request from the remote center is received, ECU 1 is configured to perform the rewrite process for rewriting the contents of the control program that is stored in the flash ROM 3.

The memory area of the flash ROM 3 is divided into, for example, two exclusive memory areas 31 and 32, which have no overlapping memory area, and, thus, the memory area from which the operation unit 21 reads the control program to perform a process and the memory area in which the contents of the control program is rewritten by the rewrite process are respectively different.

Therefore, even when the rewrite process is performed during execution of the control process, which is performed according to the control program read by the operation unit 21 from a memory area, the control program in such memory area, which is currently used for performing the control process, will not be rewritten. In other words, the rewriting of the control program is performable during the execution of the control process under control of the control program.

Further, even when the power supply for ECU 1 is interrupted or stopped during the execution of the rewrite process, the rewrite process for rewriting the control program that is stored in a memory area may be simply repeated after the power supply is restarted. That is, the data of the control program stored in a memory area will not be broken, and the control program is read by the operation unit 21 without problem. Therefore, the control program is rewritten independently from an operation state of ECU 1, that is, without considering whether the power supply for ECU 1 will be interrupted or not.

Thus, the ECU 1 can have an ECU state independent program rewriting that is independently performed from an operation state of ECU 1.

Further, ECU 1 has the program switching unit 23 and the re-program destination change unit 24 for selectively choosing the first memory area 31 or the second memory area 32. For instance, if the program switching unit 23 selects the first memory area 31 to be used as the memory area from which the operation unit 21 reads the control program, the re-program destination change unit 24 selects the second memory area 32 to be used as the memory area that stores the control program, which is rewritten by the rewrite process.

After the completion of rewriting the control program by the rewrite process, the program switching unit 23 selects the memory area in which the control program has been rewritten by the rewrite process when the predetermined program switch condition that is defined according to the contents of the control program is met. The re-program destination change unit 24 selects the memory area (i.e., either the first memory area 31 or the second memory area 32) that is not the memory area selected by the program switching unit 23.

In such manner, after the completion of the control program by the rewrite process, at an appropriate timing in terms of the appropriateness for the contents of the rewritten program, the control program, which is to be read from the memory area of the flash ROM 3, is switched. Therefore, the problems and glitches caused by switching the control program, i.e., by the execution of the switched control program, is prevented. In the present embodiment, a program switch condition is a state in which the rewritten program that is rewritten by the rewrite process is not in operation. Therefore, the problem caused by switching the contents of the certain program during the execution of such program by the operation unit 21 is prevented.

In the present disclosure, the flash ROM 3 may be referred to as a non-volatile memory in claims, a determination condition of the process in S10 may be a rewrite condition in claims, the first memory area 31 and the second memory area 32 are divided memory areas in claims, the program switching unit 23 may be a read switching unit in claims, the re-program destination change unit 24 may be a rewrite switching unit in claims, and a program switch condition may be a read switching condition in claims.

Although the present disclosure has been fully described in connection with the preferred embodiment thereof with reference to the accompanying drawings, it is to be noted that various changes and modifications will become apparent to those skilled in the art. For example, the two non-overlapping memory areas 31, 32 of the flash ROM 3 in the above embodiment may be changed to three or more non-overlapping memory areas in the ROM 3.

Further, the memory areas 31, 32 in the same (i.e., one) ROM 3 in the above embodiment may be changed to the memory areas 31, 32 in respectively different ROMs.

Further, hardware implementation of the program switching unit 23 and the re-program destination change unit 24 of the present disclosure may be changed to software implementation of the units 23, 24, or may be changed to a mixture/combination of hardware/software implementations.

Further, the usage information storage 221 and the re-program completion flag 222 provided in the register group 22 of the present disclosure may be changed to a dedicated hardware that provides the usage information storage 221 and the re-program completion flag 222.

Further, the re-program completion flag 222 is changed (S150) after the content of the usage information storage 221 is changed (S140). However, the steps may be interchanged, such that the re-program completion flag 222 is changed first and then the information stored in the usage information storage 221 is changed.

Such changes and modifications are to be understood as being within the scope of the present disclosure as defined by the appended claims.

What is claimed is:
1. An electronic control unit comprising:
 a memory area in a non-volatile memory for storing a control program controlling a predetermined control object, the memory area being rewritable, and having a plurality of sub-memory areas exclusively defined in a non-overlapping manner;
 an operation unit performing a process according to the control program stored in the non-volatile memory and performing a rewrite process to rewrite contents of the control program stored in the memory area when a predetermined rewrite condition is met;
 a read switch unit selectively switching to one of the plurality of sub-memory areas as the read sub-memory area from which the operation unit reads the control program when the operation unit performs the process according to the control program; and
 a rewrite switch unit selectively switching to one of the plurality of sub-memory areas as the rewrite sub-memory area in which the rewrite process rewrites program contents of the control program, wherein from among the plurality of sub-memory areas of the memory area, a read sub-memory area, from which the control program is read by the operation unit to perform the process according to the control program, is different and separate from a rewrite sub-memory area, which stores program contents of the control program that is rewritten by the rewrite process, the rewrite switch unit is configured to selectively switch to one of the plurality of sub-memory areas that is different from one of the plurality of sub-memory areas to which the read switch unit is currently switched to, and the read switch unit is configured to switch to one of the plurality of sub-memory areas in which the program contents of the control program have been rewritten by the rewrite process after the rewrite process completes rewriting of the control program and when a read switching condition is fulfilled, the read switching condition is set according to the program contents of the control program rewritten by rewrite process, wherein the read switching condition is defined as a condition that a currently-performed process, which is controlled by the control program, is not controlled by a rewrite-affected portion of the control program, which is changed during a rewrite process of the control program.

2. An electronic control unit comprising:

a memory area in a non-volatile memory for storing a control program controlling a predetermined control object, the memory area being rewritable, and having a plurality of sub-memory areas exclusively defined in a non-overlapping manner;

an operation unit performing a process according to the control program stored in the non-volatile memory and performing a rewrite process to rewrite contents of the control program stored in the memory area when a predetermined rewrite condition is met;

a read switch unit selectively switching to one of the plurality of sub-memory areas as the read sub-memory area from which the operation unit reads the control program when the operation unit performs the process according to the control program; and a rewrite switch unit selectively switching to one of the plurality of sub-memory areas as the rewrite sub-memory area in which the rewrite process rewrites program contents of the control program, wherein from among the plurality of sub-memory areas of the memory area, a read sub-memory area, from which the control program is read by the operation unit to perform the process according to the control program, is different and separate from a rewrite sub-memory area, which stores program contents of the control program that is rewritten by the rewrite process, the rewrite switch unit is configured to selectively switch to one of the plurality of sub-memory areas that is different from one of the plurality of sub-memory areas to which the read switch unit is currently switched to, and the read switch unit is configured to switch to one of the plurality of sub-memory areas in which the program contents of the control program have been rewritten by the rewrite process after the rewrite process completes rewriting of the control program and when a read switching condition is fulfilled, the read switching condition is set according to the program contents of the control program rewritten by the rewrite process, wherein the read switching condition includes a condition regarding a vehicle state, and the vehicle state includes at least one of a vehicle speed, an operation of a vehicle component, or a vehicle charge condition.

3. The electronic control unit of claim 1, wherein the predetermined rewrite condition is the receipt of a reprogramming request by the operation unit.

* * * * *